United States Patent
Liljestrand

(10) Patent No.: US 10,315,560 B2
(45) Date of Patent: Jun. 11, 2019

(54) SYSTEM AND METHOD FOR SAFETY IMPROVEMENT DURING OPERATION OF A MOTOR VEHICLE

(71) Applicant: Scania CV AB, Södertälje (SE)

(72) Inventor: Andreas Liljestrand, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 15/501,871

(22) PCT Filed: Aug. 3, 2015

(86) PCT No.: PCT/SE2015/050843
§ 371 (c)(1),
(2) Date: Feb. 6, 2017

(87) PCT Pub. No.: WO2016/024899
PCT Pub. Date: Feb. 18, 2016

(65) Prior Publication Data
US 2017/0246987 A1    Aug. 31, 2017

(30) Foreign Application Priority Data
Aug. 13, 2014  (SE) ...................................... 1450938

(51) Int. Cl.
*B60Q 1/46* (2006.01)
*B60Q 1/00* (2006.01)
*B60Q 1/54* (2006.01)

(52) U.S. Cl.
CPC .............. *B60Q 1/46* (2013.01); *B60Q 1/0088* (2013.01); *B60Q 1/54* (2013.01)

(58) Field of Classification Search
CPC ........... B60Q 1/46; B60Q 1/54; B60Q 1/0088
(Continued)

(56) References Cited

U.S. PATENT DOCUMENTS 6,333,687 B1   12/2001   LaBelle ....................... 340/466
6,864,784 B1 *  3/2005   Loeb ................. G08G 1/096716
                                                                 180/171
(Continued)

FOREIGN PATENT DOCUMENTS

DE   10 2008 008 868 A1   8/2008
DE   10 2013 011 171 A1   2/2014
(Continued)

OTHER PUBLICATIONS

Supplementary European Search Report dated Feb. 22, 2018 issued in corresponding European Patent Application EP 15 83 2489.
(Continued)

*Primary Examiner* — Tuan C To
(74) *Attorney, Agent, or Firm* — Ostrolenk Faber LLP

(57) ABSTRACT

A method for safety improvement during operation of a motor vehicle (100) includes the steps of: —determining a prevailing speed of the vehicle (100); automatically activating a warning flasher function (275) on the basis of determined values pertaining to at least some combination of conditions based on: vehicle speed (V) and gradient (L) of the running surface on which the vehicle (100) is travelling, and the speed of the vehicle (100) compared with surrounding traffic and the gradient (L) of the running surface on which the vehicle (100) is travelling. Also a computer program product including program code (P) for a computer (200; 210) for implementing the method is disclosed. Also a system for safety improvement during operation of a motor vehicle (100) and to a motor vehicle (100) which is equipped with the system are disclosed.

15 Claims, 3 Drawing Sheets

(58) Field of Classification Search
USPC .......................................................... 702/154
See application file for complete search history.

(56) References Cited

U.S. PATENT DOCUMENTS

| | | | | |
|---|---|---|---|---|
| 7,057,501 | B1 | 6/2006 | Davis ........................... | 340/435 |
| 7,765,047 | B2* | 7/2010 | Yu ........................... | F16H 59/66 |
| | | | | 477/121 |
| 8,566,034 | B1* | 10/2013 | Van Wyck Loomis ...................... | |
| | | | | G01S 19/49 |
| | | | | 701/480 |
| 2001/0005805 | A1* | 6/2001 | Saotome ................. | F16D 48/06 |
| | | | | 701/67 |
| 2002/0156557 | A1* | 10/2002 | Gras .................. | B60R 16/0232 |
| | | | | 701/31.7 |
| 2003/0100986 | A1* | 5/2003 | Lee .................... | B60G 17/0195 |
| | | | | 701/70 |
| 2004/0012488 | A1* | 1/2004 | Schofield ............... | B60Q 1/302 |
| | | | | 340/435 |
| 2006/0079377 | A1* | 4/2006 | Steen ...................... | B60T 7/122 |
| | | | | 477/186 |
| 2006/0097859 | A1* | 5/2006 | Nordbruch ............... | B60Q 9/00 |
| | | | | 340/440 |
| 2008/0319602 | A1* | 12/2008 | McClellan ............. | G07C 5/008 |
| | | | | 701/31.4 |
| 2009/0235744 | A1* | 9/2009 | Tsai ....................... | B62K 5/007 |
| | | | | 73/514.02 |
| 2010/0207787 | A1* | 8/2010 | Catten ............... | G06F 17/30241 |
| | | | | 340/905 |
| 2010/0217507 | A1* | 8/2010 | Braunberger ....... | F02N 11/0803 |
| | | | | 701/112 |
| 2011/0010065 | A1* | 1/2011 | Bach ...................... | B60K 31/04 |
| | | | | 701/70 |
| 2011/0022267 | A1* | 1/2011 | Murphy ................. | A01B 69/00 |
| | | | | 701/38 |
| 2012/0185167 | A1* | 7/2012 | Higuchi ............. | G01C 21/3602 |
| | | | | 701/461 |
| 2014/0067155 | A1* | 3/2014 | Yu .......................... | B60W 40/13 |
| | | | | 701/1 |
| 2014/0180535 | A1* | 6/2014 | Baehrle-Miller ....... | B60T 7/042 |
| | | | | 701/34.4 |
| 2015/0197247 | A1* | 7/2015 | Ichinokawa ........ | B60W 30/143 |
| | | | | 701/93 |
| 2015/0353095 | A1* | 12/2015 | Freess ....................... | B60C 9/00 |
| | | | | 701/41 |
| 2016/0311362 | A1* | 10/2016 | Fendt .................... | B60Q 1/085 |

FOREIGN PATENT DOCUMENTS

| | | | | |
|---|---|---|---|---|
| EP | 2 756 992 A1 | | 7/2014 | |
| JP | 2009220762 A | * | 10/2009 | |
| JP | 2012120368 A | * | 6/2012 | |
| JP | 2012-153294 | | 8/2012 | |
| KR | 20030042562 A | * | 6/2003 | ......... B60G 17/0195 |
| WO | WO 89/01424 | | 2/1989 | |
| WO | WO 2008/002756 A2 | | 1/2008 | |
| WO | WO 2012/042355 A1 | | 4/2012 | |

OTHER PUBLICATIONS

International Search Report dated Nov. 5, 2015 in corresponding PCT International Application No. PCT/SE2015/050843.
Written Opinion dated Nov. 5, 2015 in corresponding PCT International Application No. PCT/SE2015/050843.

* cited by examiner

SYSTEM AND METHOD FOR SAFETY IMPROVEMENT DURING OPERATION OF A MOTOR VEHICLE

CROSS-REFERENCE TO RELATED APPLICATIONS

The present application is a 35 U.S.C. §§ 371 national phase conversion of PCT/SE2015/050843, filed Aug. 3, 2015, which claims priority of Swedish Patent Application No. 1450938-4, filed Aug. 13, 2014, the contents of which are incorporated by reference herein. The PCT International Application was published in the English language.

TECHNICAL FIELD

The present invention relates to a method for safety improvement during operation of a motor vehicle. The invention relates also to a computer program product comprising program code for a computer for implementing a method according to the invention. The invention relates also to a system for safety improvement during operation of a motor vehicle and to a motor vehicle which is equipped with the system.

BACKGROUND

In hilly terrain where roads run downhill and/or uphill, some vehicles travel much more slowly than others. Such is for example the case in mountainous areas where heavy trucks have to negotiate major upgrades or downgrades. This may entail the driver of such a vehicle manually activating warning flashers to make drivers of other vehicles aware that his/her vehicle is travelling at a relatively low speed. However, such activation of warning flashers may be sporadic and inconsistent. Some drivers of vehicles travelling markedly more slowly than other traffic may for example forget or not bother to activate/deactivate warning flashers in such situations.

A known practice is to provide cars with functionality for automatically activating warning flashers when the vehicle becomes involved in various kinds of accident, e.g. a collision with another vehicle or a fixed object.

Another known practice is to provide heavy vehicles in particular with functionality for automatically activating warning flashers when the vehicle is subjected to sharp braking and is thereby relatively quickly retarded relative to surrounding traffic.

U.S. Pat. No. 7,057,501 describes a method for automatic activation of warning flashers when it is detected that a vehicle behind is relatively close.

SUMMARY OF THE INVENTION

There is a need for an effective, reliable and user-friendly way of achieving safety improvement during operation of a motor vehicle.

One object of the present invention is to propose a novel and advantageous method for safety improvement during operation of a motor vehicle.

Another object of the invention is to propose a novel and advantageous system for safety improvement during operation of a motor vehicle and a novel and advantageous computer program for controlling measures for safety improvement during operation of a motor vehicle.

A further object of the invention is propose an alternative method for safety improvement during operation of a motor vehicle, an alternative system for safety improvement during operation of a motor vehicle and an alternative computer program for controlling measures for safety improvement for a motor vehicle at relatively low speeds.

One aspect of the present invention is a proposed method for safety improvement during operation of a motor vehicle, comprising the steps of:
  determining a prevailing speed of said vehicle;
  automatically activating a warning flasher function;
  automatically activating said warning flasher function on the basis of determined values pertaining to at least some combination of conditions based on:
vehicle speed and gradient of the running surface on which the vehicle is travelling, and
the vehicle's speed compared with surrounding traffic and the gradient of the running surface on which the vehicle is travelling.

The method is applicable for example when a motor vehicle is travelling relatively slowly on a running surface with a gradient exceeding a predetermined value. Said predetermined value of the gradient of said running surface may for example be 3%, 5%, 10% or 15%. Said activation of said warning flasher function may be activated automatically when said vehicle is travelling at a speed below a predetermined value when said gradient is greater than said predetermined value. Said predetermined value of said vehicle speed may for example be 20, 30, 40 or 50 km/h.

The method is applicable when a motor vehicle is travelling at a relatively low speed compared with surrounding traffic on a running surface with a gradient exceeding a predetermined value. Said predetermined value of the gradient of said running surface may for example be 3%, 5%, 10% or 15%. Said activation of said warning flasher function may be activated automatically when said vehicle is travelling at a speed which differs from other vehicles by more than a predetermined value when said gradient is greater than said predetermined value. Said predetermined value for said difference between vehicle speeds may for example be 40, 50, 75 or 100 km/h. This applies when other vehicles are travelling faster than the host vehicle and in one example are overtaking/passing the host vehicle. In such situations it is therefore appropriate to use warning flasher function to indicate to drivers of fast-moving vehicles that the host vehicle is travelling relatively slowly and that caution needs to be observed.

The method may comprise the steps of:
  determining whether said prevailing vehicle speed is below a predetermined value;
  determining whether said gradient is greater than a predetermined value; and
  automatically activating said warning flasher function in cases where determined conditions are fulfilled, irrespective of whether said gradient is uphill or downhill.

The result is a versatile method which is applicable when a vehicle is travelling at reduced speed uphill or downhill. Said reduced speed, i.e. prevailing vehicle speed below a predetermined value, may be caused by the vehicle's weight, including cargo, the magnitude of the gradient of the running surface, the performance of the vehicle's engine, the power mobilization required and the braking action required.

The method may comprise the steps of:
  determining a power mobilization of the vehicle; and
  determining resulting vehicle speed as a basis for deciding whether automatic activation of said warning flasher function should take place or not.

In cases where a certain power mobilization determined does not result in a desired vehicle speed, it may be found that a gradient of a running surface on which the vehicle is travelling is greater than said predetermined value. In this situation said resulting vehicle speed will be below said predetermined value at which said warning flasher function is automatically activated according to one aspect of the present invention. Such may typically be the case when the vehicle is travelling uphill at a relatively low speed.

The method may comprise the steps of:
determining required braking action of the vehicle; and
determining resulting vehicle speed during said braking action as a basis for deciding whether automatic activation of warning flasher function should take place, or not.

In cases where a certain braking action determined does not result in an expected reduction of a prevailing vehicle speed, it may be found that a gradient of a running surface on which the vehicle is travelling is greater than said predetermined value. In this situation a vehicle speed resulting during braking will be below said predetermined value at which said warning flasher function is automatically activated according to one aspect of the present invention. This may typically be the case when the vehicle is travelling downhill at a relatively low speed.

The method may comprise the step of:
determining surrounding traffic speeds and comparing them with the host vehicle's determined prevailing speed as a basis for deciding whether automatic activation of said warning flasher function should take place, or not.

The result is a flexible method for safety improvement. Controlling said automatic activation of said warning flasher function on the basis of surrounding traffic speeds achieves a user-friendly and circumstantially appropriate method for safety improvement. In cases where surrounding vehicles continuously, intermittently or occasionally pass/overtake the host vehicle, said warning flasher function may with advantage be activated. In one embodiment, automatic activation of said warning flasher function will take place when the vehicle is travelling on a running surface where the gradient is greater than said predetermined gradient and the vehicle's prevailing speed differs by a certain value from those of passing vehicles. This applies to both uphill and downhill travel.

The method may comprise the step of:
automatically deactivating said automatically activated warning flasher function when said conditions are no longer fulfilled.

Automatic deactivation of said warning flasher function may with advantage take place when the gradient of said running surface on which the vehicle is travelling is below said predetermined value, e.g. when said running surface is substantially horizontal. Automatic deactivation of said warning flasher function may with advantage take place when the vehicle's speed is greater than said predetermined speed and/or when a difference between the vehicle's speed and those of other vehicles is relatively small, e.g. less than 10 km/h.

One aspect of the present invention is a proposed system for safety improvement during operation of a motor vehicle, comprising:
means suited to determining a prevailing speed of said vehicle;
means suited to automatically activating a warning flasher function;
means suited to automatically activating said warning flasher function on the basis of determined values pertaining to at least some combination of conditions based on:
vehicle speed and gradient of the running surface on which the vehicle is travelling, and the vehicle's speed compared with surrounding traffic and the gradient of the running surface on which the vehicle is travelling.

The system may comprise:
means suited to determining whether said prevailing vehicle speed is below a predetermined value;
means suited to determining whether said gradient is greater than a predetermined value; and
means suited to automatically activating said warning flasher function in cases where determined conditions are fulfilled, irrespective of whether said gradient is uphill or downhill.

The system may comprise:
means suited to determining a power mobilization of the vehicle; and
means suited to determining resulting vehicle speed as a basis for deciding whether automatic activation of said warning flasher function should take place, or not.

The system may comprise:
means suited to determining required braking action of the vehicle; and
means suited to determining resulting vehicle speed during said braking action as a basis for deciding whether automatic activation of warning flasher function should take place or not.

The system may comprise:
means suited to determining surrounding traffic speeds and comparing them with the host vehicle's determined prevailing speed as a basis for deciding whether automatic activation of said warning flasher function should take place or not.

The system may comprise:
means suited to automatically deactivating said automatically activated warning flasher function when said conditions are no longer fulfilled.

One aspect of the present invention is a proposed motor vehicle provided with a system according to the invention. The vehicle may be any from among a truck, bus or car.

One aspect of the present invention is a proposed computer program for safety improvement during operation of a motor vehicle, which program comprises program code for causing an electronic control unit or a computer connected to the electronic control unit to perform steps disclosed herein.

One aspect of the present invention is a proposed computer program for safety improvement during operation of a motor vehicle, which program comprises program code for causing an electronic control unit or a computer connected to the electronic control unit to perform steps disclosed herein when said program code is run on said control unit or said computer.

One aspect of the present invention is a proposed computer program for safety improvement during operation of a motor vehicle, which program comprises program code stored on a computer-readable medium for causing an electronic control unit or a computer connected to the electronic control unit to perform steps according to the invention.

One aspect of the present invention is a proposed computer program for safety improvement during operation of a motor vehicle, which program comprises program code stored on a computer-readable medium for causing an electronic control unit or a computer connected to the electronic control unit to perform steps according to the invention when said program code is run on said control unit or said computer.

One aspect of the present invention is a proposed computer program product comprising a program code stored on a computer-readable medium for performing method steps according to the invention when said program code is run on an electronic control unit or a computer connected to the electronic control unit.

One aspect of the present invention is a proposed computer program product comprising a program code stored in a non-volatile way on a computer-readable medium for performing method steps according to the invention when said computer code is run on an electronic control unit or a computer connected to the electronic control unit.

Further objects, advantages and novel features of the present invention will be indicated to one skilled in the art by the following details, as also by implementing the invention. Whereas the invention is described below, it should be noted that it is not limited to the specific details described. One skilled in the art who has access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read in conjunction with the accompanying drawings, in which the same reference notations are used for similar items in the various drawings, and in which.

DETAILED DESCRIPTION OF THE DRAWINGS

Figure 1:
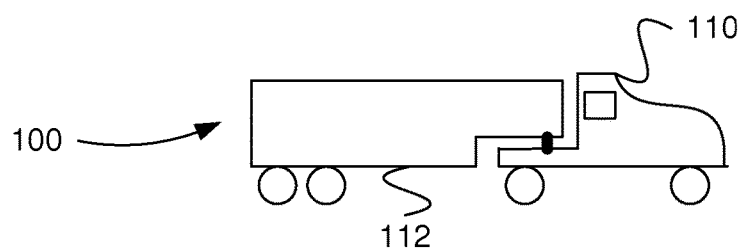
FIG. 1 illustrates schematically a motor vehicle according to an embodiment of the invention.

FIG. 1 depicts a sideview of a vehicle 100. The vehicle exemplified comprises a tractor vehicle 110 and a towed vehicle 112. The vehicle 100 may be a heavy vehicle, e.g. a truck or a bus. It may alternatively be a car or some other vehicle which can be operated in traffic, e.g. a vehicle combination comprising a tractor, contractor machine, etc.

The term "link" refers herein to a communication link which may be a physical line, such as an opto-electronic communication line, or a non-physical line such as a wireless connection, e.g. a radio link or microwave link.

Figure 2:
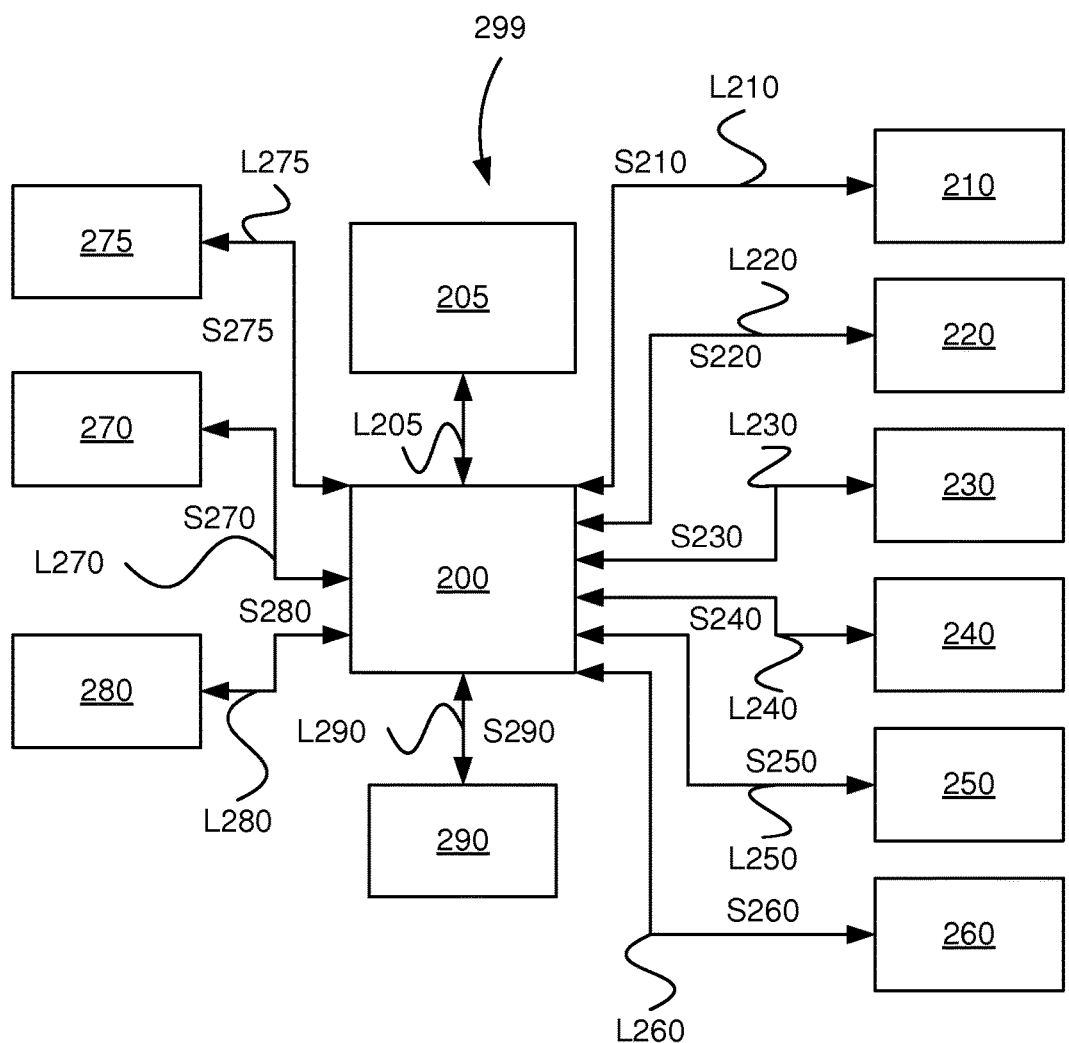
FIG. 2 illustrates schematically a system of the vehicle depicted in FIG. 1, according to an embodiment of the invention.

FIG. 2 illustrates schematically a system 299 of the vehicle 100 depicted in FIG. 1, according to one embodiment of the invention.

The system 299 comprises a first control unit 200 which may be an electronic control unit (ECU).

A first sensor configuration 210 is arranged for communication with the first control unit 200 via a first link L210 and is suited to continuously determining a prevailing speed V of the vehicle 100. The first sensor configuration may comprise a speed sensor. The first sensor configuration is arranged to continuously send to the first control unit 200 via the first link L210 signals S210 which convey information about said prevailing vehicle speed V.

A second sensor configuration 220 is arranged for communication with the first control unit 200 via a second link L220 and is suited to continuously determining a required power mobilization of the vehicle 100. The second sensor configuration may comprise a level sensor pertaining to a speed control of the vehicle, e.g. an accelerator pedal. The second sensor configuration is arranged to continuously send to the first control unit 200 via the second link L220 signals S220 which convey information about a prevailing required power mobilization.

A third sensor configuration 230 is arranged for communication with the first control unit 200 via a third link L230 and is suited to continuously determining a prevailing gradient L of a running surface on which said vehicle 100 is travelling. The third sensor configuration may comprise a gradient sensor. The third sensor configuration is arranged to continuously send to the first control unit 200 via the third link L230 signals S230 which convey information about a prevailing gradient L of said running surface.

A fourth sensor configuration 240 is arranged for communication with the first control unit 200 via a fourth link L240 and is suited to continuously determining a number of respective relative speeds Vrel between the vehicle 100 and vehicles travelling in the surroundings of the vehicle 100. The fourth sensor configuration may comprise a video camera and/or IR camera (for use in night driving) and appropriate image processing programs. In this case the fourth sensor configuration will be arranged to use said programs to determine a difference in speed between the host vehicle 100 and external vehicles which overtake/pass the vehicle 100. The fourth sensor configuration is arranged to continuously send to the first control unit 200 via the fourth link L240 signals S240 which convey information about said continuously determined relative speeds Vrel.

The fourth sensor configuration 240 is in one variant suited to continuously determining maximum permissible speeds by identifying traffic signs. One variant identifies speed signs which indicate maximum permissible speeds. The fourth sensor configuration may comprise a video camera and/or IR camera (for use in night driving) and appropriate image processing programs. In this case the fourth sensor configuration is arranged to use said programs to determine maximum permissible speeds by identifying traffic signs.

A fifth sensor configuration 250 is arranged for communication with the first control unit 200 via a fifth link L250 and is suited to continuously determining a number of respective relative speeds Vrel between the vehicle 100 and vehicles travelling in its surroundings.

The fifth sensor configuration 250 may in one variant comprise a communication unit adapted to receiving signals from vehicles travelling in the surroundings of the vehicle 100 (via so-called vehicle-to-vehicle communication). These signals from surrounding traffic may in one variant comprise information about speeds at which surrounding vehicles are travelling. This information will be used to determine a number of respective relative speeds $V_{ref}$ between the vehicle 100 and vehicles travelling in its surroundings. In one variant said communication unit is adapted to sending signals to surrounding vehicles, e.g. information about speed.

The fifth sensor configuration 250 may in one variant comprise a radar unit for distance determination and suitable data processing programs. The fifth sensor configuration may comprise a laser unit for distance determination and suitable data processing programs. The fifth sensor configuration may comprise an ultrasonic unit for distance determination and suitable data processing programs. In such cases the fifth sensor configuration is arranged to use said programs to determine relative differences in speed between the host vehicle 100 and detected external vehicles which for example overtake/pass the vehicle 100. The fifth sensor configuration is arranged to continuously send to the first control unit 200 via the fifth link L250 signals S250 which convey information about said continuously determined relative speeds Vrel.

In one example of a version, the first control unit 200 is arranged to determine whether a number of vehicles pass/overtake the host vehicle 100. This may be by means of said fourth sensor configuration 240 and/or fifth sensor configuration 250.

In cases where at least a certain number of vehicles are determined as passing/overtaking the host vehicle 100 and said gradient L is greater than said predetermined value Lth, e.g. 5%, said warning flasher function may be automatically activated.

In cases where a certain number of vehicles are determined as passing/overtaking the host vehicle 100 during a predetermined period of time, e.g. 1, 2 or 3 minutes, and said gradient L is greater than a predetermined value Lth, e.g. 5%, said warning flasher function may be automatically activated.

In cases where at least a certain number of vehicles are determined as passing/overtaking the host vehicle 100 and said gradient L is not greater than said predetermined value Lth, e.g. 5%, said activated warning flasher function may be automatically deactivated.

In cases where at least a certain number of vehicles are determined as passing/overtaking the host vehicle 100 during a predetermined period of time, e.g. 1, 2 or 3 minutes, and said gradient L is not greater than a predetermined value Lth, e.g. 5%, said activated warning flasher function may be automatically deactivated.

In cases where fewer than a predetermined number of vehicles are determined as passing/overtaking the host vehicle 100 during a predetermined period of time, e.g. 1, 2 or 3 minutes, and said gradient L is not greater than said predetermined value Lth, e.g. 5%, said activated warning flasher function may be automatically deactivated.

A sixth sensor configuration 260 is arranged for communication with the first control unit 200 via a sixth link L260 and is suited to continuously determining a required braking action of service brakes of the vehicle 100. The sixth sensor configuration may comprise a level sensor pertaining to a brake control of the vehicle, e.g. a brake pedal. The sixth sensor configuration is arranged to continuously send to the first control unit 200 via the sixth link L260 signals S260 which convey information about a prevailing required braking action.

The first control unit 200 is adapted to determining whether various supplementary brakes of the vehicle 100 are activated. One example of such a supplementary brake is a so-called retarder. Said retarder may be arranged for manual activation. It may be arranged for automatic activation by the first control unit 200. Another example of such a supplementary brake may be an exhaust brake pertaining to a combustion engine of said vehicle 100. Said exhaust brake may be arranged for automatic activation by said first control unit.

In one example of a version an electronic card is stored in the memory of the first control unit 200. Said card may for example contain information about topology of surroundings of the vehicle 100. It may thus contain information about a gradient of a running surface on which the vehicle is travelling. In this version the vehicle may further be provided with a positioning unit (not depicted), e.g. a GPS unit. Said positioning unit may continuously determine a prevailing location of the vehicle and continuously supply this information to the first control unit via a link intended for the purpose (not depicted). In this case the first control unit will be arranged to continuously determine a prevailing gradient L of the running surface on which the vehicle is travelling, which may be on the basis of information from said electronic card and the vehicle's current location indication provided by said positioning unit. The first control unit may be arranged to activate/deactivate a set of warning flashers 275 on the basis of the thus determined gradient L of said running surface and either or both of the vehicle's prevailing speed V and its prevailing speed compared with surrounding traffic (said relative speeds Vrel).

In one example of a version, information about prevailing maximum permissible speed is stored in a memory of the first control unit 200 in association with said electronic card. Maximum permissible speeds may also be determined in other ways, e.g. by identifying traffic signs which for example indicate maximum permissible speed. Said electronic card may accordingly contain information about a gradient L of a running surface on which the vehicle 100 is travelling, as well as said prevailing maximum permissible speed for the vehicle 100. The first control unit 200 may then be arranged to activate/deactivate a set of warning flashers 275 on the basis of the thus determined gradient L (e.g. from said electronic card) of said running surface, prevailing speed V and said prevailing maximum permissible speed for the vehicle. In one example said set of warning flashers might be automatically activated in situations where said gradient L is greater than a predetermined value Lth, said vehicle speed V is below a predetermined value Vth which differs from said prevailing maximum permissible speed for the vehicle 100. In this example said set of warning flashers may be automatically activated when a prevailing gradient L is greater than 5%, said prevailing vehicle speed V, e.g 50 km/h, is below Vth, e.g. 60 km/h on a section of road where said prevailing maximum permissible speed is 110 km/h.

In one example of a version the first control unit 200 may be arranged to automatically activate/deactivate said set of warning flashers 275 on the basis of a chosen gearshift program for a transmission of said vehicle 100, where said control of said transmission is in a so-called automatic position. Said gearshift program may be defined as a chosen gearshift mode, e.g. a "power mode" or an "ecological gear shifting mode". For said respective chosen modes the first control unit is arranged to effect changes between different gear steps in a gearbox which is part of the vehicle's transmission according to stored routines. Said automatic activation/deactivation may take place on the basis of a chosen prevailing gearshift program in combination for example with the vehicle's prevailing speed V, a prevailing gradient L of the running surface on which the vehicle is travelling and/or the vehicle's speed V compared with surrounding traffic, also called relative speeds Vrel.

A first operating means 270 is provided for manual activation/deactivation of said set of warning flashers 275 of the vehicle 100 and is adapted to communication with the first control unit 200 via a link L270. Said first operating means is arranged to respond to being operated (activation/ deactivation) by sending to said first control unit 200 via the said link L270 signals S270 which convey information about activation or deactivation of said warning flashers, whereupon said first control unit 200 is adapted to sending to said set of warning flashers via a link L275 signals which convey information about activation or deactivation. This makes it possible for a driver to manually activate or deactivate said set of warning flashers irrespective of their automatic activation/deactivation. The driver is thus enabled ultimately to determine for him/herself whether said set of warning flashers is to be activated or deactivated.

Said warning flashers 275 may comprise a suitable number of light devices. Warning flashers may typically be provided both front and back on the right and left sides of the vehicle as seen in a direction of forward movement. Other or supplementary locations for said light devices constituting warning flashers may also be appropriate. Said warning flashers may intermittently emit for example orange light to draw the attention of other road users/drivers/operators in the surroundings of said vehicle 100.

The first control unit 200 is adapted to communication with said set of warning flashers 275 via said link L275. The first control unit in one version is arranged to effect activation/deactivation of said set of warning flashers on the basis of said signals S275.

A second operating means 280 is provided for manual activation/deactivation of the function of the method according to the invention and is adapted to communication with said first control unit via a link L280. Said second operating means may for example comprise a push-button or changeover switch, e.g. a control device or lever. Said second operating means is arranged to respond to manual operation by a driver by sending to the first control unit 200 signals S280 which convey information to the effect that the function according to the invention is to be activated or deactivated. A driver/operator of the vehicle 100 may thus disconnect/connect the function of the method according to the invention via said second operating means 280. Deactivation of the function according to the invention may be desired in countries/regions where there are restrictions on the use of warning flashers. Activation of the function according to the invention may be desired in countries/regions where there are no restrictions on the use of warning flashers or where for other reasons their use is appropriate, convenient or required (e.g. by law).

Presentation means 290 are provided for communication with the first control unit 200 via the link L290. Said presentation means may comprise a viewing screen, e.g. a touchscreen. The first control unit is arranged to send to the presentation means 290 via said link L290 signals S290 conveying relevant information concerning the method according to the invention. The presentation means are arranged to display said information for a driver/operator of said vehicle 100. Said information may for example comprise messages such as "warning flashers have been activated automatically and are now active" or "warning flashers have been deactivated automatically and are now inactive".

The first control unit 200 is arranged to continuously or intermittently determine a prevailing speed V of said vehicle. This may be by means of said first sensor configuration 210. The first control unit is arranged to continuously or intermittently determine a prevailing gradient L of a running surface on which the vehicle 100 is travelling. This may be by means of said third sensor configuration 230. The first control unit is arranged to continuously or intermittently determine relative speeds Vrel between the vehicle 100 and vehicles travelling in its surroundings. This may be by means of said fourth sensor configuration 240 and/or said fifth sensor configuration 250.

The system 299 is herein described is arranged to determine a number of respective relative speeds Vrel between the vehicle 100 and other vehicles. In one version said activation/deactivation of said warning flashers 275 may take place on the basis of such a relative speed between the vehicle 100 and an external vehicle. In one version said activation/deactivation of said warning flashers may be on the basis of a number of such relative speeds between the vehicle 100 and corresponding external vehicles. In one version said activation/deactivation of said warning flashers may be on the basis of an average value of said relative speeds between the vehicle 100 and corresponding external vehicles.

The first control unit 200 is arranged to automatically activate and deactivate a warning flasher function 275 of the vehicle 100. The first control unit is accordingly arranged to automatically activate said set of warning flashers.

The first control unit 200 is arranged to automatically activate said warning flasher function 275 on the basis of determined values pertaining to at least some combination of conditions based on:

vehicle speed V and gradient L of the running surface on which the vehicle 100 is travelling, and the vehicle's speed V compared with those of surrounding traffic and the gradient L of the running surface on which the vehicle is travelling.

In one embodiment the first control unit 200 is arranged to automatically activate said set of warning flashers 275 when a prevailing vehicle speed V is below a predetermined value Vth and a gradient L of the running surface on which the vehicle 100 is travelling is greater than a predetermined value Lth, and/or when a relative difference between the vehicle's speed V and a determined speed of at least one nearby vehicle is greater than a predetermined value and said gradient L of the running surface on which the vehicle is travelling is greater than a predetermined value Lth.

In one embodiment the first control unit 200 is arranged to automatically deactivate said set of warning flashers 275 when a prevailing vehicle speed V is greater than a predetermined value Vth and a gradient L of the running surface on which the vehicle 100 is travelling is below a predetermined value Lth, and/or when a relative difference between the speed V of the vehicle 100 and a determined speed of at least one nearby vehicle is below a predetermined value and said gradient L of the running surface on which the vehicle 100 is travelling is below a predetermined value Lth.

In one embodiment the first control unit 200 is arranged to determine whether said prevailing vehicle speed V is below a predetermined value Vth. The first control unit is accordingly arranged to determine whether said gradient L is greater than a predetermined value Lth and to automatically activate said warning flasher function 275 in cases where said prevailing vehicle speed V is below a predetermined value Vth and said gradient L is greater than a predetermined value Lth. This may take place irrespective of whether said gradient L is uphill or downhill.

In one embodiment the first control unit 200 is arranged to determine a prevailing power mobilization of the vehicle 100 and to determine a resulting vehicle speed V as a basis for deciding whether automatic activation of said warning flashers 275 should take place or not.

In one embodiment the first control unit 200 is arranged to determine a required braking action of the vehicle 100 and to determine a resulting vehicle speed V during said braking action as a basis for deciding whether automatic activation of said warning flashers 275 should take place or not.

In one embodiment the first control unit 200 is arranged to determine surrounding traffic speeds and compare them with the vehicle's determined prevailing speed V, as a basis for deciding whether automatic activation of the function of said warning flasher function 275 should take place or not.

In one embodiment the first control unit 200 is arranged to automatically deactivate said automatically activated warning flasher function 275 when said conditions pertaining to vehicle speed V and running surface gradient L and/or to relative speeds Vrel and running surface gradient L are no longer fulfilled.

A second control unit 205 is arranged for communication with the first control unit 200 via a link L205. The second control unit may be detachably connected to the first control unit. The second control unit may be a control unit external to the vehicle 100. The second control unit may be arranged to perform the method steps according to the invention. The second control unit may be used to crossload program code to the first control unit, particularly program code for applying the method according to the invention. The second control unit may alternatively be arranged for communication with the first control unit via an internal network of the vehicle. The second control unit may be arranged to perform substantially similar functions to those of the first control unit 200.

Figure 3:
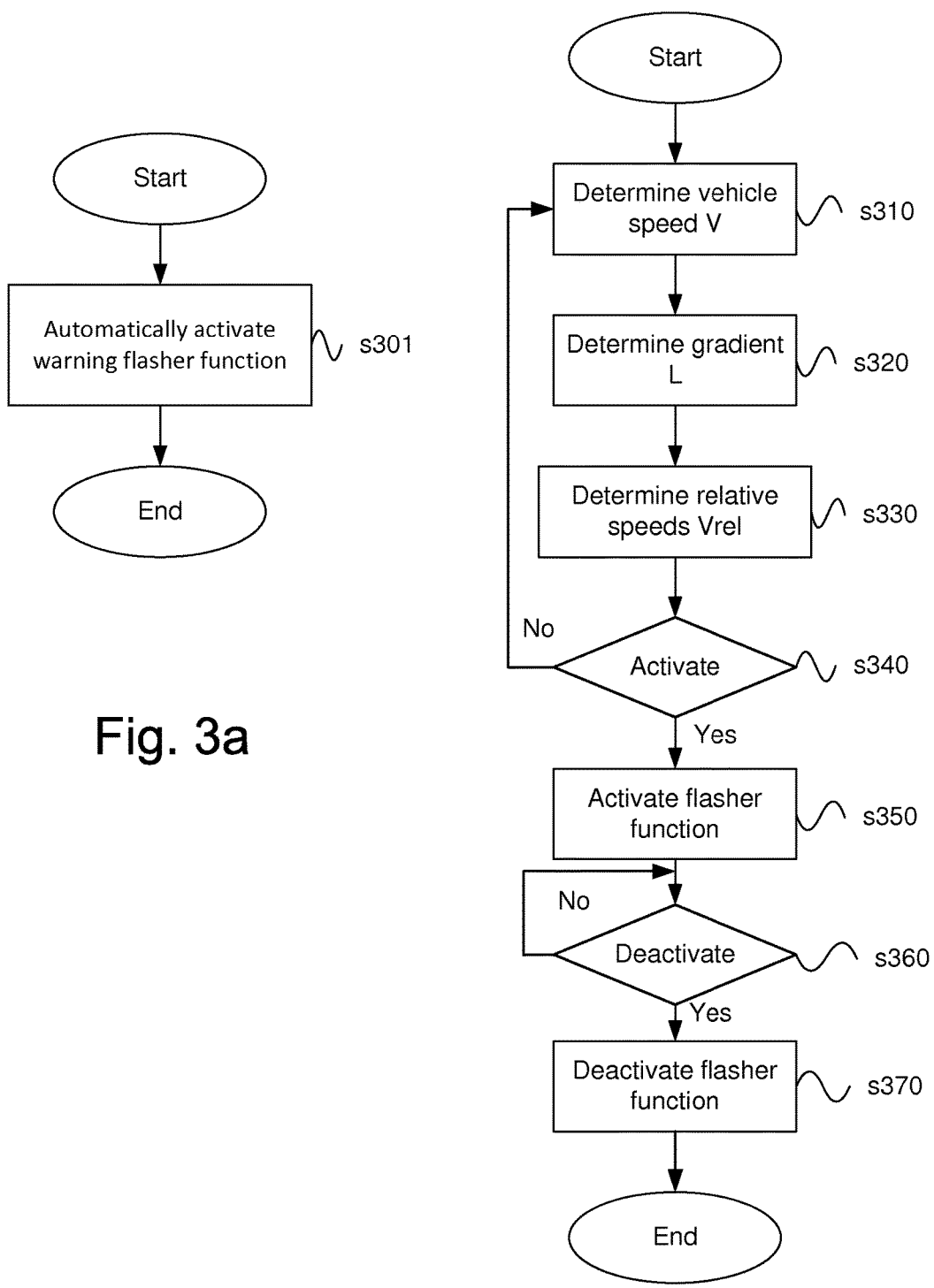
FIG. 3a illustrates schematically a flowchart of a method according to an embodiment of the invention.
FIG. 3b illustrates schematically a more detailed flowchart of a method according to an embodiment of the invention.

FIG. 3a is a schematic flowchart of a method for safety improvement during operation of a motor vehicle 100. The method comprises a first step s301 comprising the steps of:
- determining a prevailing speed V of said motor vehicle 100;
- automatically activating a warning flasher function 275;
- automatically activating said warning flasher function 275 on the basis of determined values pertaining to at least some combination of conditions based on:

vehicle speed V and gradient L of the running surface on which the vehicle 100 is travelling, and
the speed of the vehicle 100 compared with surrounding traffic and the gradient L of the running surface on which the vehicle is travelling.

The method ends after step s301.

FIG. 3b is a schematic flowchart of a method for safety improvement during operation of a motor vehicle 100 according to one aspect of the present invention.

The method comprises a first step s310 which may comprise the step of continuously determining a prevailing speed V of said vehicle 100. This may be by means of said first sensor configuration 210. Step s310 is followed by a step s320.

Method step s320 may comprise the step of continuously determining a prevailing gradient L of the running surface on which the vehicle 100 is travelling. This may be by means of said third sensor configuration 230 and/or said stored electronic card and positioning unit. Step s320 is followed by a step s330.

Method step s330 may comprise the step of continuously determining respective relative speeds Vrel between the vehicle 100 and vehicles in surrounding traffic. In this case the speed V of the vehicle 100 compared with surrounding traffic is determined. This may be by means of said fourth sensor configuration 240 and/or said fifth sensor configuration 250. Step s330 is followed by a step s440.

Method step s340 comprises the step of deciding whether activation of said set of warning flashers 275 should take place or not. This may done in various ways according to the method of the invention.

Said decision of whether activation of said set of warning flashers 275 should take place or not may be based on the parameters of vehicle speed V and gradient L of the running surface on which the vehicle 100 is travelling, or on the parameters of the vehicle's speed V compared with surrounding traffic and the gradient L of the running surface on which the vehicle is travelling.

If activation of said set of warning flashers 275 should take place, i.e. "Yes", the method continues with a further step s350. If activation of said set of warning flashers should not take place, i.e. "No", the method returns to step s310, i.e. determining continuously whether said set of warning flashers should be activated or not.

Method step s350 comprises the step of activating said set of warning flashers 275, whereupon the first control unit 200 is arranged to operate said set of warning flashers as appropriate.

While said set of warning flashers 275 are activated, a further step s360 takes place. It comprises the step of deciding whether said set of warning flashers should be deactivated or not. This may be effected by the first control unit 200 as appropriate.

If deactivation of said set of warning flashers 275 is to take place, i.e. "Yes", the method continues with a further step s370. If deactivation of said set of warning flashers is not to take place, i.e. "No", the method returns to step s360, i.e. determining continuously whether said set of warning flashers should be deactivated or not.

Method step s370 comprises the step of deactivating said set of warning flashers 275. The method ends after step s370.

Figure 4:
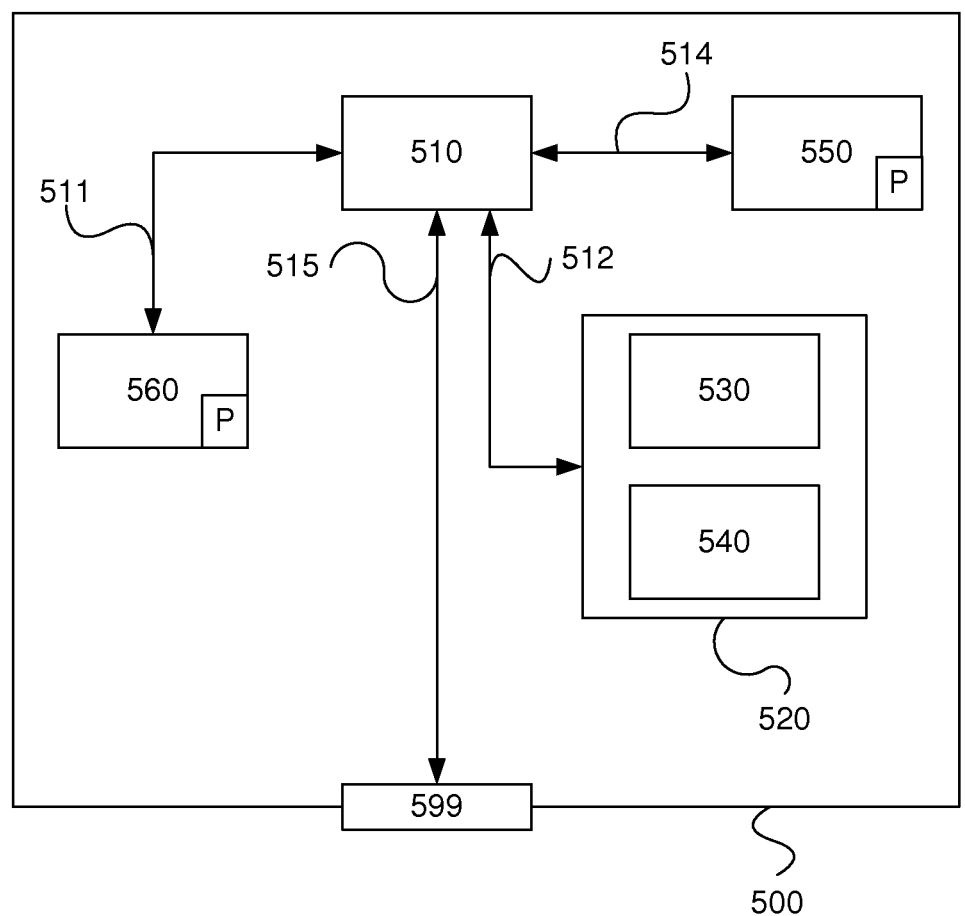
FIG. 4 illustrates schematically a computer according to an embodiment of the invention.

FIG. 4 is a diagram of one version of a device 500. The control units 200 and 205 described with reference to FIG. 2 may in one version comprise the device 500 which itself comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A computer program P is here proposed for safety improvement during operation of a motor vehicle 100. The program may comprise routines for determining a prevailing speed V of said motor vehicle 100.

The program P may comprise routines for automatically activating a warning flasher function 275. The program may comprise routines for automatically activating said warning flasher function on the basis of determined values pertaining to at least some combination of conditions based on:
vehicle speed V and gradient L of the running surface on which the vehicle 100 is travelling, and
the speed of the vehicle 100 compared with surrounding traffic Vrel and the gradient L of the running surface on which the vehicle 100 is travelling.

The program P may comprise routines for determining whether said prevailing vehicle speed V is below a predetermined value Vth. It may comprise routines for determining whether said gradient L is greater than a predetermined value Lth. It may comprise routines for automatically activating said warning flasher function 275 in cases where determined conditions are fulfilled, irrespective of whether said gradient L is uphill or downhill.

The program P may comprise routines for determining a power mobilization of the vehicle 100. It may comprise routines for determining resulting vehicle speed V as a basis for deciding whether automatic activation of said warning flasher function 275 should take place or not.

The program P may comprise routines for determining required braking action of the vehicle 100. It may comprise routines for determining resulting vehicle speed V during said braking action as a basis for deciding whether automatic activation of said warning flasher function 275 should take place or not.

The program P may comprise routines for determining surrounding traffic speeds and comparing them with the vehicle's determined prevailing speed V as a basis for deciding whether automatic activation of said warning flasher function 275 should take place or not.

The program P may comprise routines for automatically deactivating said automatically activated warning flasher function 275 when said conditions are no longer fulfilled.

The program P may be stored in an executable form or in compressed form in a memory 560 and/or in a read/write memory 550.

Where the data processing unit 510 is described as performing a certain function, it means that the data processing unit conducts a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit via a data bus 514. The links L205, L210, L220, L230, L240, L250, L260, L270, L275, L280 and L290 for example may be connected to the data port (see FIG. 2).

When data are received on the data port 599, they are stored temporarily in the second memory element 540. When input data received have been temporarily stored, the data processing unit 510 will be prepared to conduct code execution as described above. In one version signals received on the data port contain information about a prevailing determined speed V of the vehicle 100, prevailing gradient L of a running surface for the vehicle 100 and a number of relative speeds Vrel pertaining to vehicles in the surroundings of the vehicle 100.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention has been provided to illustrate and describe the invention. It is not intended to be exhaustive, nor to restrict the invention to the variants described. Many modifications and variations will obviously suggest themselves to one skilled in the art. The embodiments were chosen and described in order best to explain the principles of the invention and their practical applications and thereby make it possible for one skilled in the art to understand the invention for different embodiments and with the various modifications appropriate to the intended use.

The invention claimed is:

1. A method of operating a warning flasher of a motor vehicle traveling on a running surface, the method comprising:
   determining a prevailing speed of said vehicle;
   automatically activating the warning flasher when a gradient of the running surface is greater than a threshold and at least one of the following conditions is met:
   (1) a speed of the vehicle is below a set value, or
   (2) a difference between the speed of the vehicle compared with a speed of surrounding traffic exceeds a predetermined value,
   wherein the warning flasher is on at least one of a front, back and side of the motor vehicle and is configured to warn drivers of other vehicles.

2. A method according to claim 1, comprising:
   determining whether said prevailing vehicle speed is below a predetermined value;
   determining whether said gradient is greater than a predetermined value; and
   automatically activating said warning flasher in cases where said determined conditions are fulfilled, irrespective of whether said gradient is uphill or downhill.

3. A method according to claim 1, comprising:
   determining a power mobilization of the vehicle; and
   determining the vehicle speed as a basis for deciding whether or not said automatic activation of said warning flasher should take place.

4. A method according to claim 1, comprising:
   determining required braking action of the vehicle; and
   determining the vehicle speed during said braking action as a basis for deciding whether or not said automatic activation of said warning flasher should take place.

5. A method according to claim 1, comprising:
   determining surrounding traffic speeds and comparing the surrounding traffic speeds with the vehicle's determined prevailing speed as a basis for deciding whether or not said automatic activation of said warning flasher should take place.

6. A method according to claim 1, comprising:
   automatically deactivating said automatically activated warning flasher when said conditions for automatic activation are no longer fulfilled.

7. A non-transitory computer-readable medium product incorporating code configured to control an electronic control unit or a computer connected to the electronic control unit to perform the method of claim 1 when said code is run on the electronic control unit or the computer connected to the electronic control unit.

8. A system for operating a warning flasher of a motor vehicle traveling on a running surface, the system comprising:
   a speed determining device configured to determine a prevailing speed of said vehicle;
   a flasher activation device configured to automatically activate a warning flasher;
   said flasher activation device being configured to automatically activate said warning flasher when a gradient of the running surface is greater than a threshold, and at least one of the following conditions is met:
   (1) the prevailing speed of the vehicle is below a set value, or
   (2) a difference between the prevailing speed of the vehicle compared with the speed of the surrounding traffic is greater than a predetermined value,
   wherein the warning flasher is on at least one of a front, back and side of the motor vehicle and is configured to warn drivers of other vehicles.

9. A system according to claim 8, further comprising:
   a gradient determining device configured for determining whether said gradient is greater than a predetermined value, wherein the speed determining device is configured for determining whether said prevailing vehicle speed is below a predetermined value; and said flasher activation device is configured for automatically activating said warning flasher in cases where determined conditions are fulfilled, irrespective of whether said gradient is uphill or downhill.

10. A system according to claim 8, comprising:

a determining device configured for determining a power mobilization of the vehicle; and wherein the speed determining device is configured for determining resulting vehicle speed as a basis for deciding whether or not said automatic activation of said warning flasher should take place.

11. A system according to claim 8, further comprising:

a braking action device configured for determining required braking action of the vehicle; and wherein the speed determining device is configured for determining resulting vehicle speed during said braking action as a basis for deciding whether or not said automatic activation of said warning flasher should take place.

12. A system according to claim 8, further comprising:

a traffic speed determining device configured for determining surrounding traffic speeds and for comparing said surrounding traffic speeds with the vehicle's determined prevailing speed for deciding whether or not said automatic activation of said warning flasher should take place.

13. A system according to claim 12, further comprising:

said traffic speed determining device being configured for automatically deactivating said automatically activated said warning flasher when said conditions for said automatic activation are no longer fulfilled.

14. A motor vehicle provided with a system according to claim 8.

15. A motor vehicle according to claim 14, in the form of a truck, bus or car.

\* \* \* \* \*